UNITED STATES PATENT OFFICE.

A. K. EATON, OF NEW YORK, N. Y., ASSIGNOR TO J. S. L. CUMMINS, J. EDWARDS, J. G. FIELDS, AND HENRY W. JOSLIN, ASSIGNORS TO THE JOSLIN INDIA RUBBER COMPANY.

IMPROVEMENT IN VULCANIZING RUBBER.

Specification forming part of Letters Patent No. 24,695, dated July 5, 1859.

*To all whom it may concern:*

Be it known that I, A. K. EATON, of New York, in the county and State of New York, have discovered a new and improved method of preparing caoutchouc so as to give it the requisite qualities of permanent elasticity and freedom from the effects of changes of temperature, of which the following is a specification.

The nature of my invention consists in the combination of sulphide of manganese produced by either of the methods described below and caoutchouc. The compound or mixture of the rubber with the sulphide of manganese having been effected by any of the well-known methods, it is submitted to the action of a gradually-increasing heat for several hours, the thermometer ranging during the time from 250° to 310° Fahrenheit. By this treatment the india-rubber is changed in its character, becoming more perfectly and permanently elastic, and is no longer affected by ordinary changes of temperature.

The sulphide of manganese may be prepared by either of the following processes:

First. By the decomposition of a salt of manganese by means of an alkaline sulphide. For example, by adding sulphide of ammonium to a solution of the sulphate of manganese a flesh-colored precipitate of the sulphide of manganese will be produced.

Second. By igniting a mixture of the sulphate of manganese with one-sixth of its weight of charcoal.

Third. By mingling intimately forty-four parts of the peroxide of manganese and thirty-two parts of sulphur and exposing the mixture to heat in a covered crucible.

I disclaim the ordinary mode of vulcanization by means of free sulphur, none being necessary; but

What I claim as my invention, and desire to secure by Letters Patent of the United States, is—

The use of the sulphide of manganese in the curing of india-rubber, in the manner herein specified.

A. K. EATON.

Witnesses:
    EDM. F. BROWN,
    DANIEL BREED.